United States Patent
Nishimoto (10) Patent No.: US 10,122,467 B2
(45) Date of Patent: Nov. 6, 2018

(54) OPTICAL TRANSMITTER AND CONTROL METHOD FOR OPTICAL TRANSMITTER

(71) Applicant: Fujitsu Optical Components Limited, Kawasaki-shi, Kanagawa (JP)

(72) Inventor: Hiroshi Nishimoto, Sagamihara (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 15/409,731

(22) Filed: Jan. 19, 2017

(65) Prior Publication Data

US 2017/0237500 A1    Aug. 17, 2017

(30) Foreign Application Priority Data

Feb. 17, 2016    (JP) ................................. 2016-028353

(51) Int. Cl.
| | | |
|---|---|---|
| H04B 10/00 | (2013.01) | |
| H04B 10/516 | (2013.01) | |
| G08C 23/04 | (2006.01) | |
| H04B 10/532 | (2013.01) | |
| H04B 10/572 | (2013.01) | |

(52) U.S. Cl.
CPC ......... H04B 10/5161 (2013.01); G08C 23/04 (2013.01); H04B 10/532 (2013.01); H04B 10/572 (2013.01)

(58) Field of Classification Search
USPC ................................................ 398/192–198
See application file for complete search history.

(56) References Cited

U.S. PATENT DOCUMENTS

| | | | | |
|---|---|---|---|---|
| 5,068,864 A * | 11/1991 | Javan | ................... | H01S 3/1392 |
| | | | | 372/20 |
| 5,400,417 A | 3/1995 | Allie et al. | | |
| 6,252,692 B1 * | 6/2001 | Roberts | .............. | H04B 10/2513 |
| | | | | 398/147 |
| 6,556,328 B1 * | 4/2003 | Tanaka | ................. | H04B 10/506 |
| | | | | 372/29.011 |
| 7,061,944 B2 * | 6/2006 | DeCusatis | ............ | H04B 10/506 |
| | | | | 372/18 |
| 7,062,166 B2 * | 6/2006 | Jacobowitz | .......... | H04B 10/697 |
| | | | | 398/196 |
| 7,184,671 B2 * | 2/2007 | Wang | ................... | H04B 10/503 |
| | | | | 398/195 |
| 7,321,730 B2 * | 1/2008 | Felske | ................ | H04B 10/0779 |
| | | | | 398/10 |
| 7,733,193 B2 * | 6/2010 | Kershteyn | ........... | H04L 27/2075 |
| | | | | 332/103 |
| 8,295,704 B2 * | 10/2012 | Vogel | .................... | H01S 5/0612 |
| | | | | 372/32 |
| 8,565,616 B2 * | 10/2013 | Tanaka | ............. | H04B 10/50575 |
| | | | | 398/152 |

(Continued)

FOREIGN PATENT DOCUMENTS

WO    WO 94/28455    12/1994

*Primary Examiner* — Agustin Bello
(74) *Attorney, Agent, or Firm* — Staas & Halsey LLP (57) ABSTRACT

An optical transmitter that transmits an optical signal includes a dither superimposing circuit configured to generate a dither signal, the dither signal being used to control an operation of the optical transmitter to output the optical signal, and a control circuit configured to control intermittent superimposition of the dither signal onto a target to be controlled.

13 Claims, 10 Drawing Sheets

(56) References Cited

U.S. PATENT DOCUMENTS

| | | | | |
|---|---|---|---|---|
| 8,781,327 B2* | 7/2014 | Shen | ............... | H04J 14/02 |
| | | | | 398/192 |
| 2005/0058460 A1* | 3/2005 | Wang | ............... | H04B 10/503 |
| | | | | 398/195 |
| 2005/0286909 A1* | 12/2005 | Kish, Jr. | ............... | B82Y 20/00 |
| | | | | 398/196 |
| 2009/0115544 A1 | 5/2009 | Kershteyn et al. | | |
| 2010/0119239 A1* | 5/2010 | Wang | ............... | H04B 10/50575 |
| | | | | 398/198 |
| 2011/0085794 A1* | 4/2011 | Lei | ............... | H04B 10/506 |
| | | | | 398/25 |
| 2014/0270781 A1* | 9/2014 | Nakagawa | ............... | H04B 10/60 |
| | | | | 398/83 |
| 2015/0372766 A1* | 12/2015 | Yoshida | ............... | H04B 10/2507 |
| | | | | 398/193 |
| 2016/0277121 A1* | 9/2016 | Millar | ............... | H04B 10/6972 |
| 2017/0237500 A1* | 8/2017 | Nishimoto | ............... | G08C 23/04 |
| | | | | 398/184 |

\* cited by examiner

FIG.1A

CONTINUOUSLY APPLIED DITHER

FIG.1B

DITHER WITH REDUCED AMPLITUDE

FIG.3

```
                                                                    10A
LIGHT ──> I/Q OPTICAL ──┐
SOURCE    MODULATOR     │
   11     (X-POLARIZED  │
          WAVE)         │
          20X           ├──> POLARIZATION ──> OPTICAL ──> WAVELENGTH- ──> OUTPUT OPTICAL
          I/Q OPTICAL   │    MULTIPLEXER     AMPLIFIER    TUNABLE           SIGNAL
          MODULATOR     │        13             14       OPTICAL
          (Y-POLARIZED  │                                FILTER
          WAVE)         ┘                                   15
          20Y
```

┌──────────────────────── 30
                                                    │  MONITOR  ──> CONTROL  │
                                                    │  CIRCUIT      CIRCUIT  │
                                                    │     16           17    │
                                            CS1 ◄───┤                        │
                                            CS2 ◄───┤  DITHER                │
                                                    │  SUPERIMPOSING         │
                                                    │  CIRCUIT               │
                                                    │     18                 │
                                            CS3 ◄───┤                        │
                                                    └────────────────────────┘

CS1: center transmission wavelength control signal
CS2: intermittent dither control signal
CS3: gain control signal

OPTICAL TRANSMITTER AND CONTROL METHOD FOR OPTICAL TRANSMITTER

This application is based upon and claims the benefit of priority of the prior Japanese Patent Application No. 2016-028353 filed Feb. 17, 2016, which is incorporated herein by reference in its entirety.

FIELD

The present invention relates to an optical transmitter and a control method for an optical transmitter.

BACKGROUND

In recent years, 100 Gigabit-per-second (Gbps) long-distance optical transmission has been implemented by dual-polarization quadrature phase-shift keying (DP-QPSK) using a digital coherent technology. To further improve transmission capacity, greater-level modulation schemes such as 16 quadrature amplitude modulation (16-QAM), DP-16-QAM, or 64-QAM are being developed.

Multilevel modulation such as QPSK or DP-x-QAM (where x is 8, 16, 32, 64, . . . ) is performed using an I/Q optical modulator, where "I" is the in-phase component of the waveform and "Q" represents the quadrature component. Two Mach-Zehnder (abbreviated as "MZ") interferometers are used for I/Q modulation. An optical modulator used of dual polarization such as DP-QPSK of DP-x-QAM has an I/Q optical modulator for each polarization component.

Using a I/Q optical modulator, a desired level of modulation is achieved by providing the following offsets between optical phases of lightwaves traveling through optical waveguides:

Shifting π radians between average optical phases of lightwaves travelling through two optical waveguides of the I-arm optical modulator;

Shifting π radians between average optical phases of lightwaves travelling through two optical waveguides of the Q-arm optical modulator; and Shifting π/2 radians between average optical phases of lightwaves through the I-arm optical modulator and the Q-arm optical modulator.

The average phase of lightwaves easily changes due to change in temperature or change over time. To maintain the above-noted phase differences in each of the I-arm and Q-arm, as well as between the I and Q arms, control operations are performed using a dither. See, for example, Patent Document 1 listed below. Dither is a pilot signal for control with sufficiently low frequency and small amplitude compared with the main signal.

Besides, in order to fix the operating point of an MZ optical modulator to a half-intensity point, a DC bias voltage is controlled by continuously applying dither pulses at a constant frequency fm onto the bias electrodes of the MZ optical modulator. See, for example, Patent Document 2 listed below.

LIST OF PRIOR ART DOCUMENTS

Patent Document 1: US 2009/0115544 A1
Patent Document 2: WO 1994/28455

SUMMARY

According to an aspect of the invention, an optical transmitter that transmits an optical signal has a dither superimposing circuit configured to generate a dither signal, the dither signal being used to control an operation of the optical transmitter to output the optical signal; and a control circuit configured to control intermittent superimposition of the dither signal onto a target to be controlled.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

BRIEF DESCRIPTION OF DRAWINGS

FIG. 3 illustrates an example of an optical transmitter to which intermittent dither superimposition control is applied according to an embodiment;

DESCRIPTION OF EMBODIMENTS

By increasing the multilevel value "x" of x-QAM modulation to realize large-capacity transmission, the separation between signal constellation points decreases. Because dithering is a kind of noise to main signals, the signal quality is likely to be degraded along with the decreasing of the separation between signal constellation points. Besides, control operation becomes more susceptible to adverse effect of control error as the separation between signal constellation points decreases.

When the amplitude of the dither signal is increased in order to reduce control error, then noise to the main signals increases and a transmission characteristic such as bit error rate is degraded.

Influence of noise on the main signal may be reduced by decreasing the amplitude of the dither signal. However, control errors increase and again the transmission characteristic such as bit error rate will be degraded. There is a demand for an optical transmission technique that can reduce control errors and influence of noise on the main signal when using control dither signals.

Figure 1A:
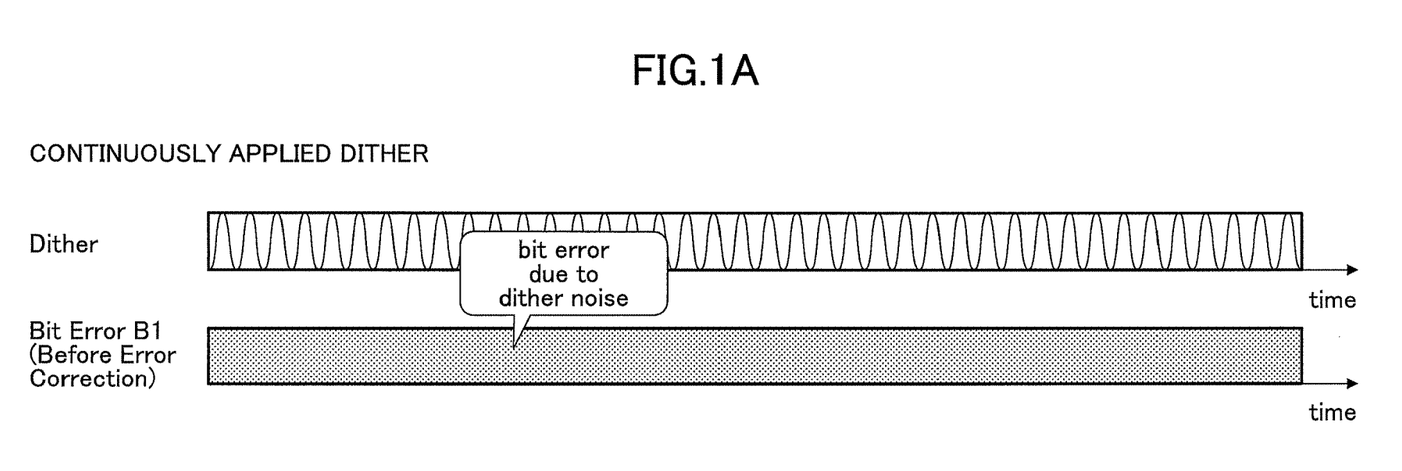
FIG. 1A is a diagram to explain a technical problem arising when using a dither signal for control.
Figure 1B:
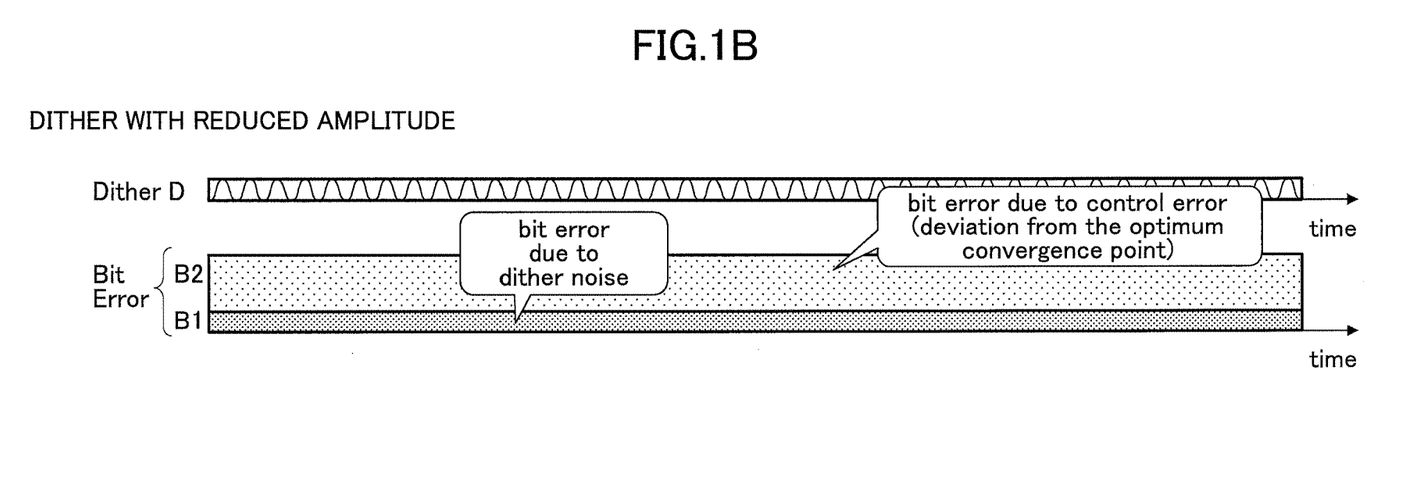
FIG. 1B is a diagram to explain a technical problem arising when using a dither signal for control.

FIG. 1A and FIG. 1B are diagrams to explain technical problems that may arise in an optical transmitter when using a dither for controlling operations. A dither signal is generally applied continuously as illustrated in FIG. 1A and FIG. 1B. The vertical dimension of the signal represents amplitude and the horizontal line represents a time axis. Although a continuous sine wave is illustrated as an example of the dither signal in these figures, the waveform of the dither signal is not limited to sine waves. Dither pulses continuously applied at a constant frequency are also included in a continuously applied dither.

In FIG. 1A, the amplitude of the dither signal is increased to a certain extent in order to reduce control error. In this case, the dither signal becomes adverse noise to the main signal and the bit error B1 due to dithering increases. The bit error B1 due to dithering increases proportional to the amplitude of the dither signal.

In FIG. 1B, the amplitude of the dither signal is reduced in order to decrease the noise to the main signal. The bit error B1 due to dithering can be reduced. However, another kind of bit error B2 due to control error, namely, deviation from the optimal point of convergence arises. In view of the total amount of bit error B1 due to dithering and bit error B2 due to control error (or the deviation from the optimal point of convergence), the transmission quality of the entirety of the optical transmitter is not improved at all.

Figure 2:
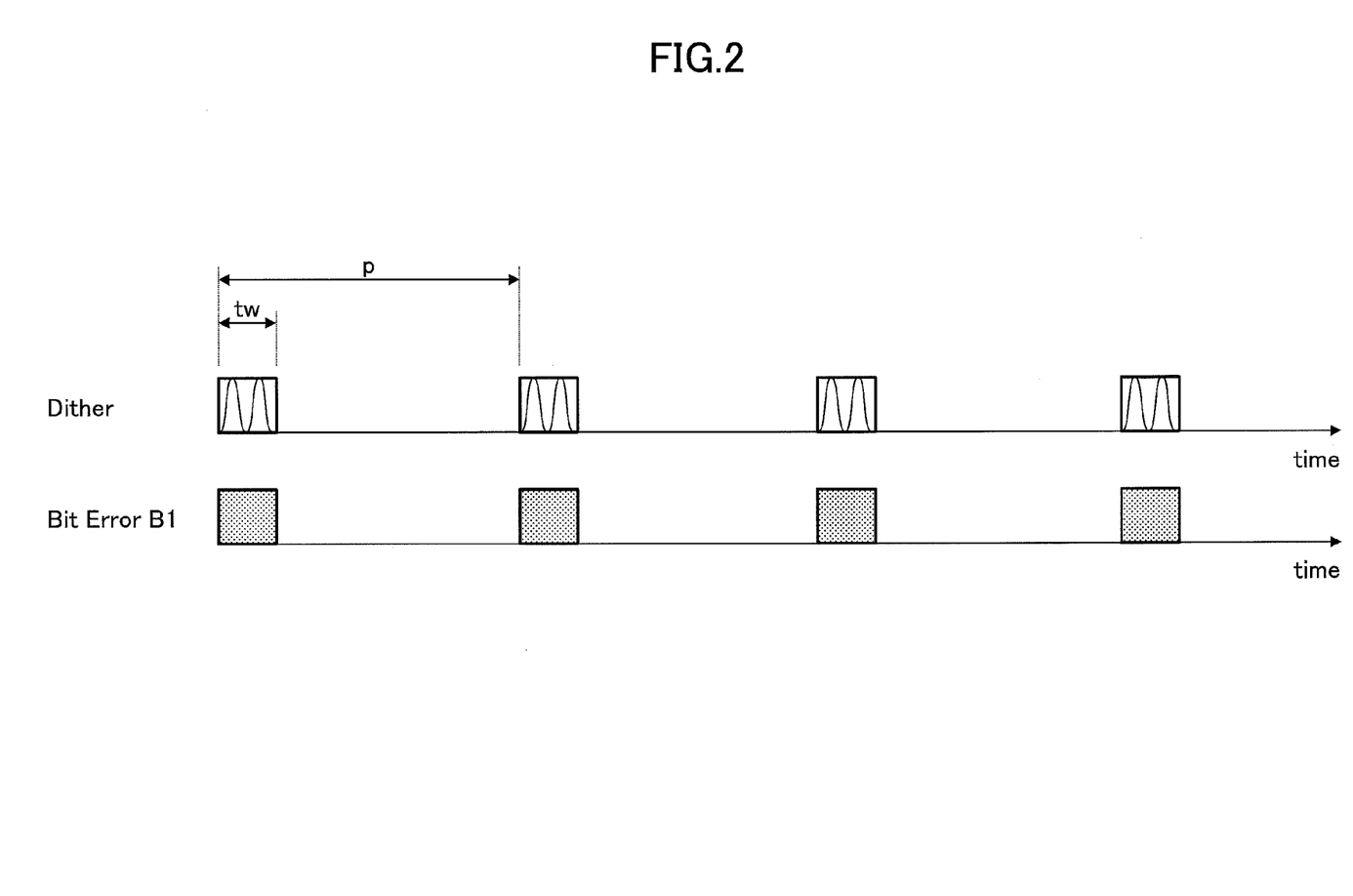
FIG. 2 is a diagram to explain the technical concept of the present invention.

FIG. 2 is a diagram to explain the technical concept of the control scheme according to the embodiment. In the embodiment, intermittent superimposition of a dither signal is performed as necessary, in place of reducing the amplitude of a continuously applied dither signal. It should be noted that in FIG. 2 a "dither signal" is a low frequency continuous wave or pulse applied over a certain time width "tw", and it does not mean a single pulse or a single cycle of sine wave. During superimposition of the dither signal over the time width "tw", bit error B1 may arise due to the dithering; however, occurrence of bit error can be reduced as a whole from the viewpoint of the entirety of the optical transmitter.

As will be explained below, parameters of intermittent dither superimposition, such as how often the dither signal is superimposed (or thinned out), at which timing the dither signal is superimposed, period P of the intermittent dither superimposition, time with "tw" of applying the dither signal, a duty ratio acquired by dividing the time width "tw" by the period P of the intermittent dither superimposition, etc., can be adjusted or changed appropriately according to a target to be controlled.

When multiple targets (e.g., two or more of a phase difference between light beams travelling through optical waveguides of an I-arm optical modulator, a phase difference between light beams travelling through optical waveguides of a Q-arm optical modulator, and a phase difference between the I-arm optical modulator and the Q-arm optical modulator) are to be controlled using dither signals, at least one of the dither signals may be thinned out selectively, depending on the target(s) to be controlled. This control scheme will be explained in more detail below. Depending on the target to be controlled, to which the dither signal is applied and/or how to detect the dither signal may vary, and a dither amplitude for reducing control error or influence of noise to a desired level may also change.

A control technique of intermittent dither superimposition is applicable to, for example, controlling of a bias voltage applied to an optical modulator or a center wavelength of the transmission band of an optical filter used in an optical transmitter.

Configuration Example 1 of Apparatus

FIG. 3 is a schematic diagram of an optical transmitter 10A to which intermittent dither superimposition is applied according to an embodiment. In the optical transmitter 10A, intermittent dither superimposition is employed to control the center wavelength of the transmission band of a wavelength-tunable optical filter.

The optical transmitter 10A has a light source 11, a I/Q optical modulator 20X for X-polarized wave component, a I/Q optical modulator 20Y for Y-polarized wave component, a polarization multiplexer 13, an optical amplifier 14, wavelength-tunable optical filter 15, a monitor circuit 16, a control circuit 17, and a dither superimposing circuit 18.

The light beam output from the light source 11 is split into two: one input to the I/Q optical modulator 20X and the other input to the I/Q optical modulator 20Y. In each of the I/Q optical modulators 20X and 20Y, an electrical data signal is converted into an optical-modulated signal. FIG. 3 is depicted focusing on the structure of the transmission front end. In actual operations, data to be transmitted are mapped by a digital signal processor to electric field information items in accordance with a modulation scheme employed and the electric field information items are supplied in the form of drive signals to the I/Q optical modulators 20X and 20Y. The I/Q optical modulators 20X and 20Y modulate the light beams emitted from the light source 11 with the data (i.e., the drive signals) and output optical-modulated signals.

As for the modulation scheme, x-level quadrature amplitude modulation (x-QAM) may be employed to realize large-capacity data transmission; however, the invention is not limited to this example. Other modulation schemes such as digital multi-subcarrier modulation or orthogonal frequency division multiplexing (OFDM) may be used. The intermittent dither superimposition process of the embodiment can be applied equally to such modulation schemes.

Outputs of the I/Q optical modulators 20X and 20Y are multiplexed at the polarization multiplexer 13. The polarization multiplexer 13 may be formed of, for example, a polarization rotator provided to one of the X-polarization and Y-polarization branches and a polarization beam combiner.

The polarization-multiplexed optical signal is amplified by the optical amplifier 14, undergoes wavelength selection at the wavelength-tunable optical filter 15, and output from the optical transmitter 10A.

The wavelength-tunable optical filter 15 is, for example, an optical bandpass filter and it lets only a light component of a designated frequency range pass through. The passband of the wavelength-tunable optical filter 15 is controlled such that the central wavelength of the passband coincides with the peak wavelength of the carrier wave of the optical signal. For this control, feedback control may be performed using a dither signal.

A portion of the optical signal output from the wavelength-tunable optical filter 15 is monitored by the monitor circuit 16. Based upon the monitoring result, several types of control signals are produced by the control circuit 17. When the central wavelength of the passband of the wavelength-tunable optical filter 15 coincides with the peak wavelength of the carrier wave of the optical signal, there is no frequency component of the dither signal detected from the optical signal monitored at the monitor circuit 16. When the central wavelength of the passband of the wavelength-tunable optical filter 15 does not coincide with the peak wavelength of the carrier wave of the optical signal, a frequency component of the dither signal is detected from the monitored signal. The control circuit 17 outputs a control signal CS1 for bringing the central wavelength of the passband of the wavelength-tunable optical filter 15 to the peak wavelength of the carrier wave of the optical signal according to the intensity and the phase of the detected dither component. The control signal CS1 may be called a "center transmission wavelength control signal".

The center transmission wavelength of the wavelength-tunable optical filter 15 is adjusted in accordance with the control signal CS1. For instance, when the wavelength-tunable optical filter 15 is an etalon-based tunable filter, the temperature of silicon forming the etalon is adjusted in a direction indicated by the control signal CS1 so as to bring the center transmission wavelength to be consistent with the peak wavelength of the carrier wave of the optical signal. There are many methods for adjusting the center transmission wavelength of the wavelength-tunable optical filter 15, other than the temperature control, and an appropriate method can be employed. Under the control using the control signal CS1, noise in the optical signal such as amplified spontaneous emission (ASE) noise generated by the optical amplifier 14 can be attenuated.

The control circuit 17 also generates a control signal CS2 based upon the monitoring result from the monitor circuit 16 and supplies the control signal CS2 to the dither superimposing circuit 18. The control signal CS2 is used to control intermittent superimposition of a dither signal, and it may be called a "intermittent dither control signal."

The control circuit 17 generates a control signal CS3 for controlling the gain of the optical amplifier 14, based upon the monitoring result from the monitor circuit 16. The control signal CS3 may be called a "gain control signal."

The monitor circuit 16, the control circuit 17, and the dither superimposing circuit 18 may be formed on a chip 30. In this case, the chip 30 may include a trans-impedance amplifier (TIA), an analog-to-digital converter (ADC), a digital-to-analog converter (DAC), a microprocessor, firmware, etc.

A portion of the optical signal output from the wavelength-tunable optical filter 15 is detected by a photodetector such as a photo diode, and an electric current (i.e., photocurrent) signal is input to the monitor circuit 16. The monitor circuit 16 has a TIA and an ADC, and outputs a digital signal representing the monitoring result detected to the control circuit 17.

The control circuit 17 and the dither superimposing circuit 18A may be realized by a microprocessor and firmware. A dither signal generated by the dither superimposing circuit 18A is converted into an analog signal by a DAC and supplied to the wavelength-tunable optical filter 15.

The dither signal produced by the dither superimposing circuit 18A and supplied to the wavelength-tunable optical filter 15 is an intermittent or discontinuous dither as illustrated in FIG. 2. The time width "tw" during which the dither is applied and the period P of the intermittent dither superimposition are controlled by the control circuit 17.

When the separation between the center of the passband of the wavelength-tunable optical filter 15 and the peak wavelength of the carrier wave of the optical signal is large, the control circuit 17 decreases the period P of the intermittent dither superimposition using the control signal CS2. When the state without shifting from the peak wavelength of the carrier wave continues over a certain period of time, the control circuit 17 outputs a control signal CS2 for instructing the dither superimposing circuit 18A to increase the period P of the intermittent dither superimposition. The dither superimposing circuit 18A generates a dither signal according to the control signal CS2 and applies the dither signal to the wavelength-tunable optical filter 15.

By controlling the timing of intermittent dither superimposition, bit error due to dither can be reduced and the transmission quality of the optical signal can be improved.

Configuration Example 2 of Apparatus

Figure 4:
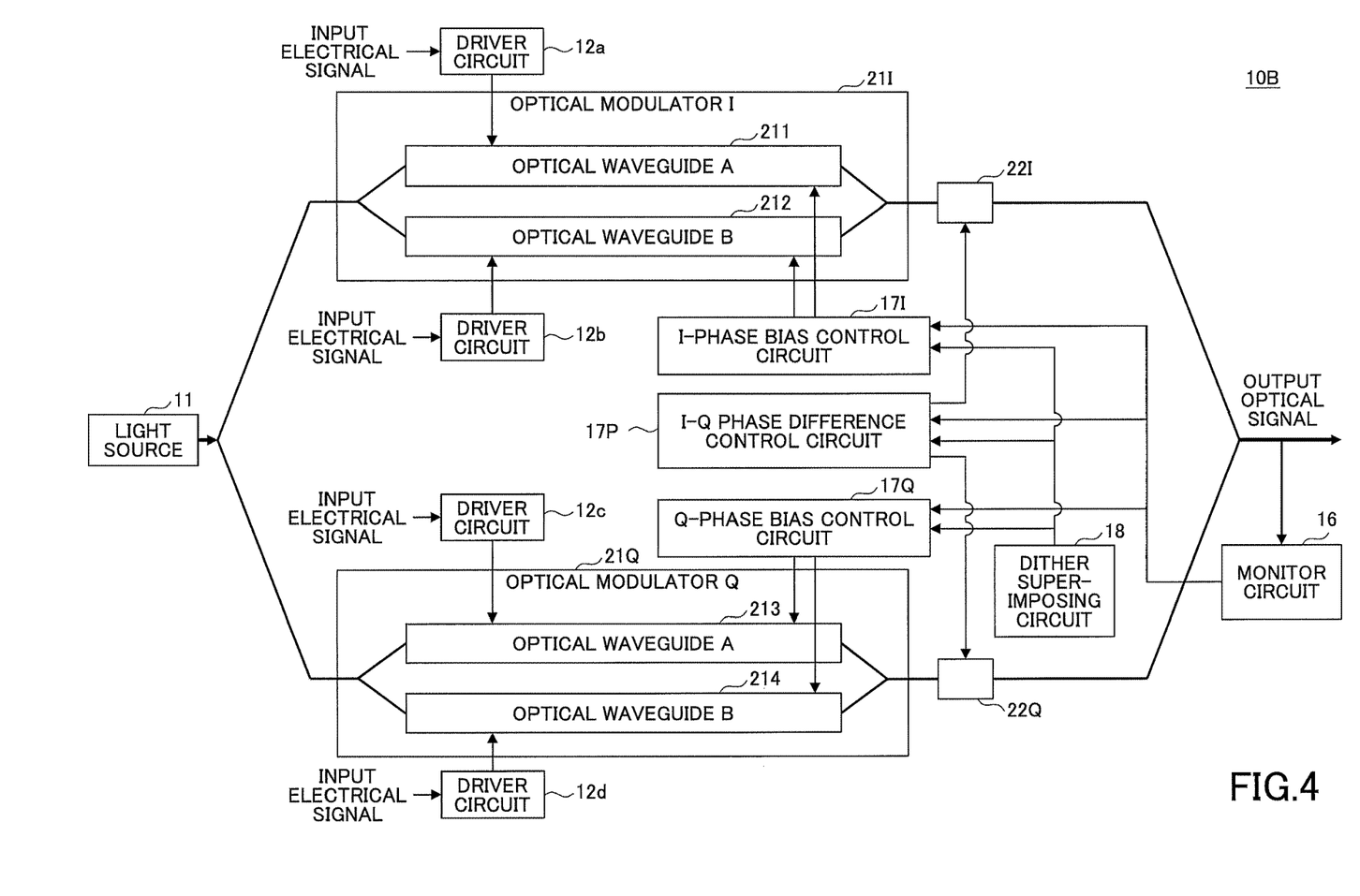
FIG. 4 illustrates another example of an optical transmitter to which intermittent dither superimposition control is applied.

FIG. 4 is a schematic diagram of an optical transmitter 10B to which intermittent dither superimposition of the embodiment is applied. In the optical transmitter 10B, intermittent dither superimposition is used to control a bias voltage applied to the optical modulator(s).

The optical transmitter 10B has a light source 11, optical modulators 21I and 21Q, driver circuits 12a to 12d, a monitor circuit 16, an I-branch optical phase bias control circuits 17I, a Q-branch optical phase bias control circuit 17Q, an I-Q phase difference control circuit 17P, a dither superimposing circuit 18A, and phase shifters 22I and 22Q. Optical modulators 21I and 21Q and the phase shifters 22I and 22Q form an I/Q optical modulator.

The optical modulator 21I is a Mach-Zehnder optical modulator with optical waveguides 211 and 212 that form a MZ interferometer. The optical modulator 21I serves as an I (in-phase) branch of the I/Q optical modulator. Similarly, the optical modulator 21Q is a Mach-Zehnder optical modulator with optical waveguides 213 and 214 that form a MZ interferometer. The optical modulator 21Q serves as a Q (quadrature) branch of the I/Q optical modulator.

The optical modulators 21I and 21Q may be lithium niobate (LiNbO3) modulators, or they may be semiconductor optical modulators using a semiconductor material such as indium phosphide (InP) or silicon (Si).

The light source 11 is, for example, a semiconductor laser. The light source 11 may have a wavelength tunable function so as to be applicable to a wavelength division multiplexing (WDM) transmission system.

The light beam output from the light source 11 is split into two: one input to the I-branch optical modulator 21I and the other input to the Q-branch optical modulator 21Q. In each of the I-branch optical modulator 21I and the Q-branch optical modulator 21Q, the input light beam is further split into two and guided to the two optical waveguides A and B. In the optical modulator 21I, the optical waveguides 211 and 212 are the optical waveguides A and B. In the optical modulator 21QI, the optical waveguides 213 and 214 are the optical waveguides A and B. The phases of the light waves traveling through the optical waveguides A and B are modulated in the opposite polarities in the optical modulator 21I and 21Q. The output of the I-branch optical modulator 21I is a binary-modulated light wave with optical phase switched between 0 radians and $\pi$ radians. The output of the Q-branch optical modulator 21Q is also a binary-modulated light wave with optical phase switched between 0 radians and $\pi$ radians. When the amplitude of the drive signal output from each of the driver circuits 12a to 12d has multiple levels, the optical signal output from the I/Q optical modulator becomes a multilevel amplitude modulated signal, while keeping the binary optical phase of 0 radians and $\pi$ radians.

The phase shifters 22I and 22Q are formed of $\pi/2$ shifting electrodes. Under application of an electric voltage, a phase rotation or phase difference of π/2 radians (90 degrees) is provided between light waves output from the optical modulators 21I and 21Q. The two light waves with a π/2 phase difference are combined and output from the I/Q modulator. The output signal is a QPSK modulated signal.

Each of the optical waveguides A (i.e., optical waveguides 211 and 213) and the optical guides B (i.e., optical waveguides 212 and 214) is furnished with a signal electrode and a phase shift bias electrode along the light propagation direction. These electrodes are omitted from the figure for the convenience of illustration. The signal electrode is a travelling wave electrode to which electrode high-frequency (e.g., 32 Gb/s) electric signal is input from corresponding one of the driver circuits 12a, 12b, 12c and 12d. Each of the driver circuits 12a to 12d and the associated signal electrode are AC coupled via a capacitor. When semiconductor optical modulators are used, a substrate DC bias voltage is applied to the signal electrode.

A portion of the optical signal containing the light components with a π/2 phase difference between them is monitored by the monitor circuit 16. The monitoring result is supplied from the monitor circuit 16 to the I-branch optical phase bias control circuit 17I, the Q-branch optical phase bias control circuit 17Q, and the I/Q phase difference control circuit 17P.

The I-branch optical phase bias control circuit 17I controls optical phase bias voltages applied to the optical waveguides 211 and 212 of the I-branch optical modulator 21I. The Q-branch optical phase bias control circuit 17Q controls optical phase bias voltages applied to the optical waveguides 213 and 214 of the Q-branch optical modulator 21Q. The I/Q phase difference control circuit 17P controls optical base bias voltages applied to the phase shifters 22I and 22Q.

The dither superimposing circuit 18 produces a dither signal and supplies the dither signal to the I-branch optical phase bias control circuit 17I, the Q-branch optical phase bias control circuit 17Q, and the I/Q phase difference control circuit 17P. The I-branch optical phase bias control circuit 17I controls the optical phase bias voltage applied to the optical modulator 21I and intermittent dither superimposing operations, based upon the monitoring result from the monitor circuit 16. The Q-branch optical phase bias control circuit 17Q controls the optical phase bias voltage applied to the optical modulator 21Q and intermittent dither superimposing operations, based upon the monitoring result from the monitor circuit 16. The I/Q phase difference control circuit 17P controls the π/2 shift bias voltage applied to the phase shifters 22I and 22Q and intermittent dither superimposing operations, based upon the monitoring result from the monitor circuit 16.

In an optical phase modulation scheme, the optical phase bias voltage for a modulator is controlled such that the center of the amplitude of the drive signal comes to the minimum point of the light intensity on the drive voltage vs light intensity characteristic curve. Optical phase bias voltage determines a static phase difference between light waves modulated by the optical waveguides A and B of an MZ optical modulator.

In operations, the optical phase bias voltages applied to the optical modulator 21I and 21Q are slightly modulated by the dither signal. By performing control operations such that the dither component contained in the alternating component of the light output from the optical modulators 12I and 21Q approaches zero, the optical phase bias voltage can be set to a desired level.

The I/Q phase difference control circuit 17P operates so as to maintain the static phase difference between the I-branch optical modulator 21I and the Q-branch optical modulator 21Q at π/2 radians. For example, the π/2 shift bias voltage applied to the phase shifter 22I and the phase shifter 22Q is slightly modulated by the dither signal. By performing control operations such that the dither component contained in the alternating component of the light output from the optical modulators 12I and 21Q approaches zero, the π/2 shift bias voltage can be set to a desired level.

The monitor circuit 16, the I-branch optical phase bias control circuit 17I, the Q-branch optical phase bias control circuit 17Q, the I/Q phase difference control circuit 17P, and the dither superimposing circuit 18 may be formed on a chip 30. In this case, the chip 30 may include a TIA, an ADC, a DAC, a microprocessor, firmware, etc.

In FIG. 4, intermittent dither superimposition is employed mainly for optical phase bias control. The invention is not limited to this example, and dither may be superimposed intermittently onto a substrate bias voltage applied to the signal electrode, or a drive signal output from each of the driver circuits 12a to 12d.

A semiconductor optical modulator makes use of a change in optical phase and optical absorbance under application of voltage. Substrate bias voltage determines a center voltage of the drive signal for driving the optical modulator. The DC voltage applied to the signal electrode is named a "substrate bias voltage" as a matter of convenience. Because the phase modulation efficiency of the optical modulator changes under application of a substrate voltage, the modulation depth (or modulation factor) can be controlled, while fixing the amplitude of the drive signal.

Substrate bias voltage or driving amplitude is slightly modulated by dithering at, for example, several kilohertz (kHz). A portion of the I-branch Q-branch combined optical signal is taken out and an alternating component contained in the optical signal is monitored by the monitor circuit 16. To acquire the alternating component, the monitor circuit 16 has a several hundred megahertz (MHz) spectrum band. The monitor circuit 16 detects a power component of the monitor signal (by a square-law detector) and performs synchronous detection to extract a dither component contained in the power component. At the operating point with the minimum alternating component detected, the frequency component of the applied dither is not detected because the dither component becomes twice the dithering frequency. When the DC bias has drifted from the optimal operating point, a dither component is detected. Depending on the direction of the DC drift, the polarity of the detected dither component varies and accordingly, the control direction for the substrate bias voltage can be known.

The control scheme described above can be carried out by either an analog electronic circuit or digital signal processing. Control on the optical phase bias and π/2 shifter bias may be performed in parallel by providing individual control circuits as illustrated in FIG. 4. Alternatively, time sharing control may be performed using a CPU. The latter is an efficient scheme from the viewpoint of reducing the circuit size. The amplitude of the dither signal for controlling the optical phases of the I-branch optical modulator 21I and the Q-branch optical modulator 21Q can be set smaller than that of the dither signal for controlling the π/2 shifter bias.

Another control circuit for controlling a substrate bias voltage may be added to the configuration of FIG. 4, or alternatively, time sharing control may be performed using a CPU among substrate bias voltage, optical phase bias voltages, and π/2 shifter bias voltage. The optical phase bias or the π/2 shifter bias may be controlled using a dither signal superimposed onto the substrate bias voltage or the drive signal applied to the signal electrode (not depicted for the convenience of illustration).

Figure 5A:
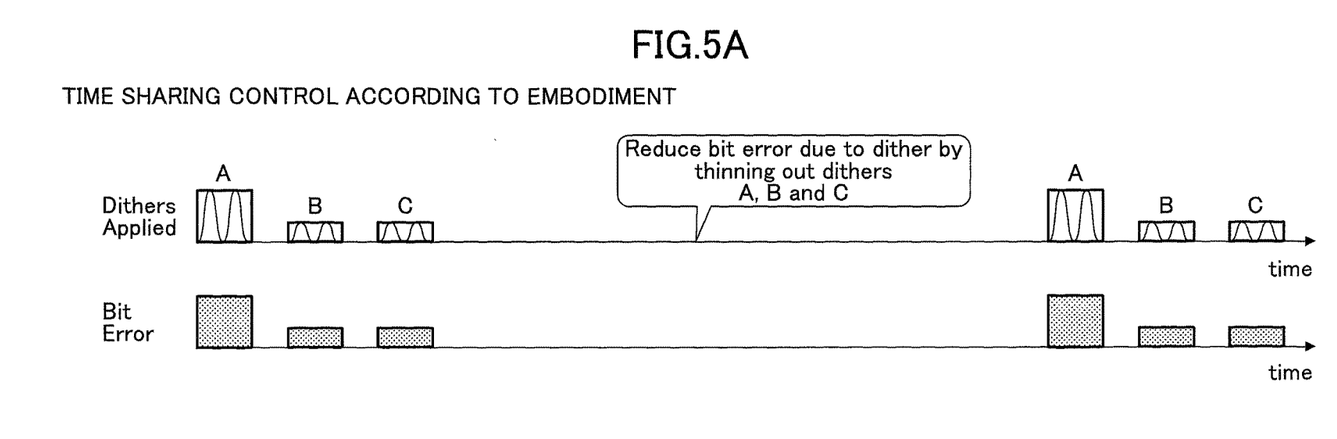
FIG. 5A illustrates time sharing control according to an embodiment.
Figure 5B:
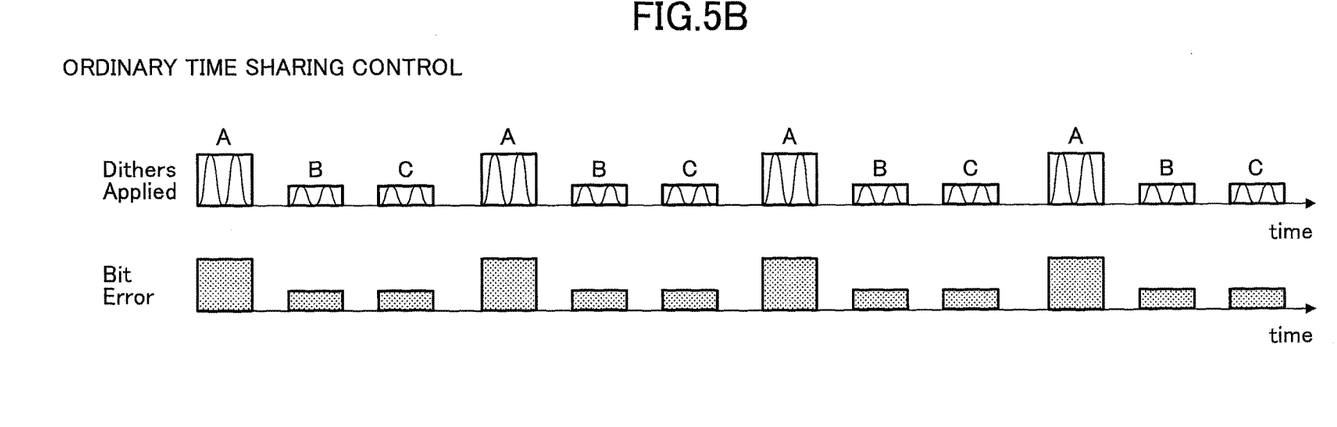
FIG. 5B illustrates ordinary time sharing control for comparison purposes.

FIG. 5A illustrates an example of time sharing control based upon the intermittent dither superimposition of the embodiment. FIG. 5B illustrates ordinary time sharing control provided for the comparison purpose. In FIG. 5A and FIG. 5B, multiple types of control operations, control A, control B and control, are performed in time sharing manner.

Control A: Control on the phase difference between I-branch and Q-branch;
Control B: Control on the optical phase of the I-branch optical modulator 21I; and
Control C: Control on the optical phase of the Q-branch optical modulator 21Q.

The amplitude of dither A is set greater than the amplitudes of dither B and dither C in order to achieve a desired level of accuracy. In general, the control accuracy is satisfactory even though the amplitudes of the dither signals for controlling the optical phases of the light beams travelling through the I-branch modulator and the Q-branch modulator are reduced.

In the ordinary time sharing control scheme illustrated in FIG. 5B, control A, control B and control C are repeated by turns. The bit error rates in control operations B and C occurring due to the dithering are less than that in control operation A due to the dithering. However, bit error arises in all of the control operations A, B and C every time dither is applied.

In contrast, in the intermittent dither superimposition of the embodiment illustrated in FIG. 5A, dithers applied to control operations A, B and C are thinned out at certain intervals. In other words, dithers are applied discontinuously at an intermittent superimposing period, in place of the time sharing control period.

By thinning out the dither signals superimposed onto control operations A, B and C, the overall bit error arising due to dithering can be reduced. Depending on the degree of influence on the optical communication system, either one or both of the period (or the interval) and the time width of dither superimposition may be changed.

Control operations A, B and C are not limited to the controlling on the π/2 phase difference between I and Q branches, I-branch optical phase, and Q-branch optical phase exemplified in FIG. 5A. The intermittent dither superimposition of the embodiment is also applicable to other types of control operations using dither. For instance, intermittent dither superimposition can be employed when performing time sharing control for the substrate bias voltages, the amplitude of drive signals, or the modulation depth of the I-branch optical modulator 21I and the Q-branch optical modulator 21Q.

Figure 6A:
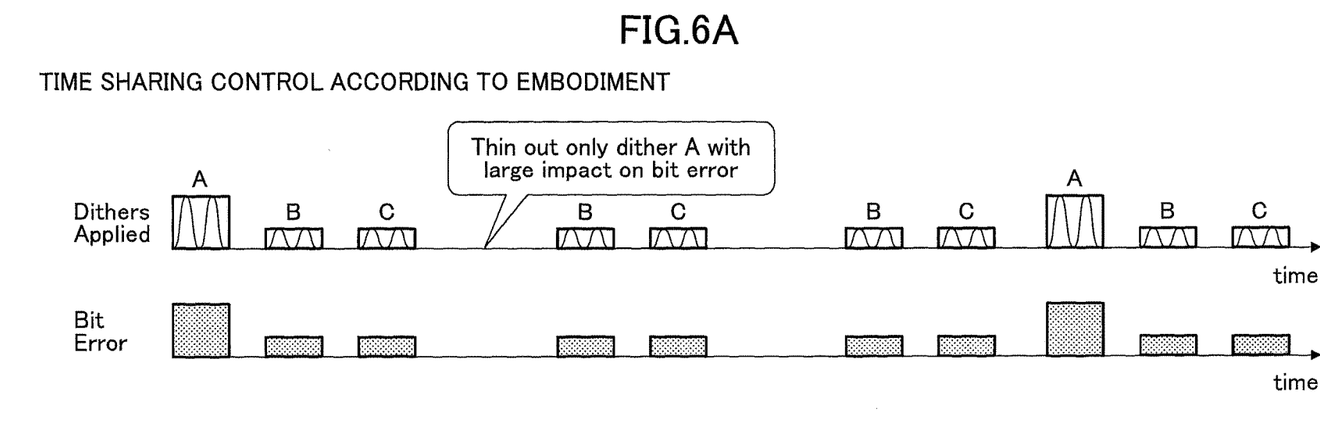
FIG. 6A illustrates time sharing control according to an embodiment.
Figure 6B:
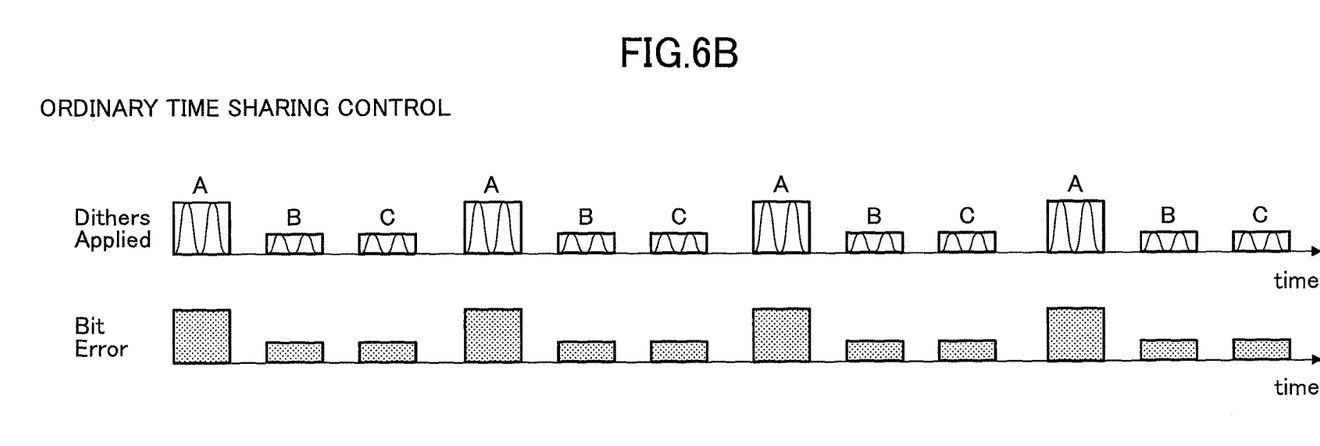
FIG. 6B illustrates ordinary time sharing control for comparison purposes.

FIG. 6A and FIG. 6B illustrate another example of intermittent dither superimposition, with FIG. 6A depicting time sharing control under intermittent dither superimposition according to an embodiment and FIG. 6B depicting ordinary time sharing control. In FIG. 6A, a dither signal applied to a specific type of control is thinned out, instead of thinning out all kinds of dither signals. As in FIG. 5A and FIG. 5B, control A represents control on the phase difference between light signals through the I-branch and the Q-branch, control B represents control on the optical phase of the light signal through the I-branch optical modulator 21I, and control C represents control on the optical phase of the light signal through the Q-branch optical modulator 21Q.

In control A, a dither signal is thinned out at certain intervals because of influence not ignorable for occurrence of bit errors. In control B and control C, dither signals are superimposed according to the time sharing control period, without applying intermittent dither superimposition, because of few or a small quantity of bit errors caused by dithering.

The intermittent dither superimposition of FIG. 6A is also applicable to other types of control operations such as control for the amplitude of drive signals, substrate bias voltages, the modulation depth, etc., performed in optical modulators 21I and 21Q.

Figure 7:
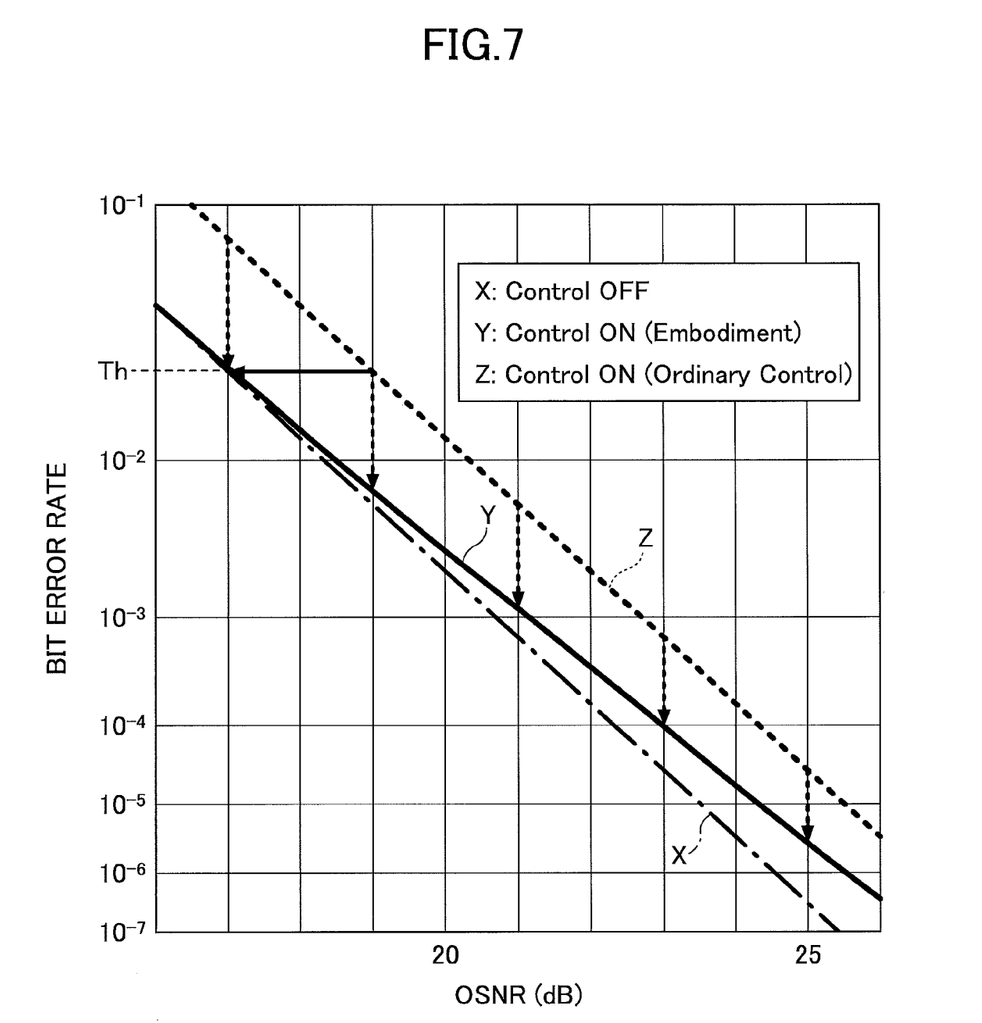
FIG. 7 illustrates improvement of bit error rate achieved by intermittent dither superimposition control according to an embodiment.

FIG. 7 illustrates improvement of bit error rate achieved by the intermittent dither superimposition of the embodiment. The horizontal axis represents optical signal to noise ratio (OSNR) and the vertical axis represents bit error rate. The chain line X indicates bit error rate in the fixed optimal bias state without dithering. The solid line Y indicates bit error rate when the total time of dither superimposition is reduced to one tenth ($1/10$), namely superimposing a dither signal once in ten times. The dashed line Z indicates bit error rate when performing ordinary control operation using dither signals.

Compared to the ordinary dithering operations, the bit error rate can be reduced by an order of magnitude when reducing the dither superimposition timing to one tenth according to the embodiment.

In x-QAM modulations, bit error rate is typically reduced using an error correcting code, for example, from $2*10^{-2}$ to $1*10^{-15}$ or less. Assuming that the bit error rate of $2*10^{-2}$ is an error correction threshold "Th", the intermittent dither superimposition of the embodiment can reduce the bit error rate even under the circumstances of low OSNR, and penalty can be maintained low.

<High-Speed Control at Start-Up>

Figure 8:
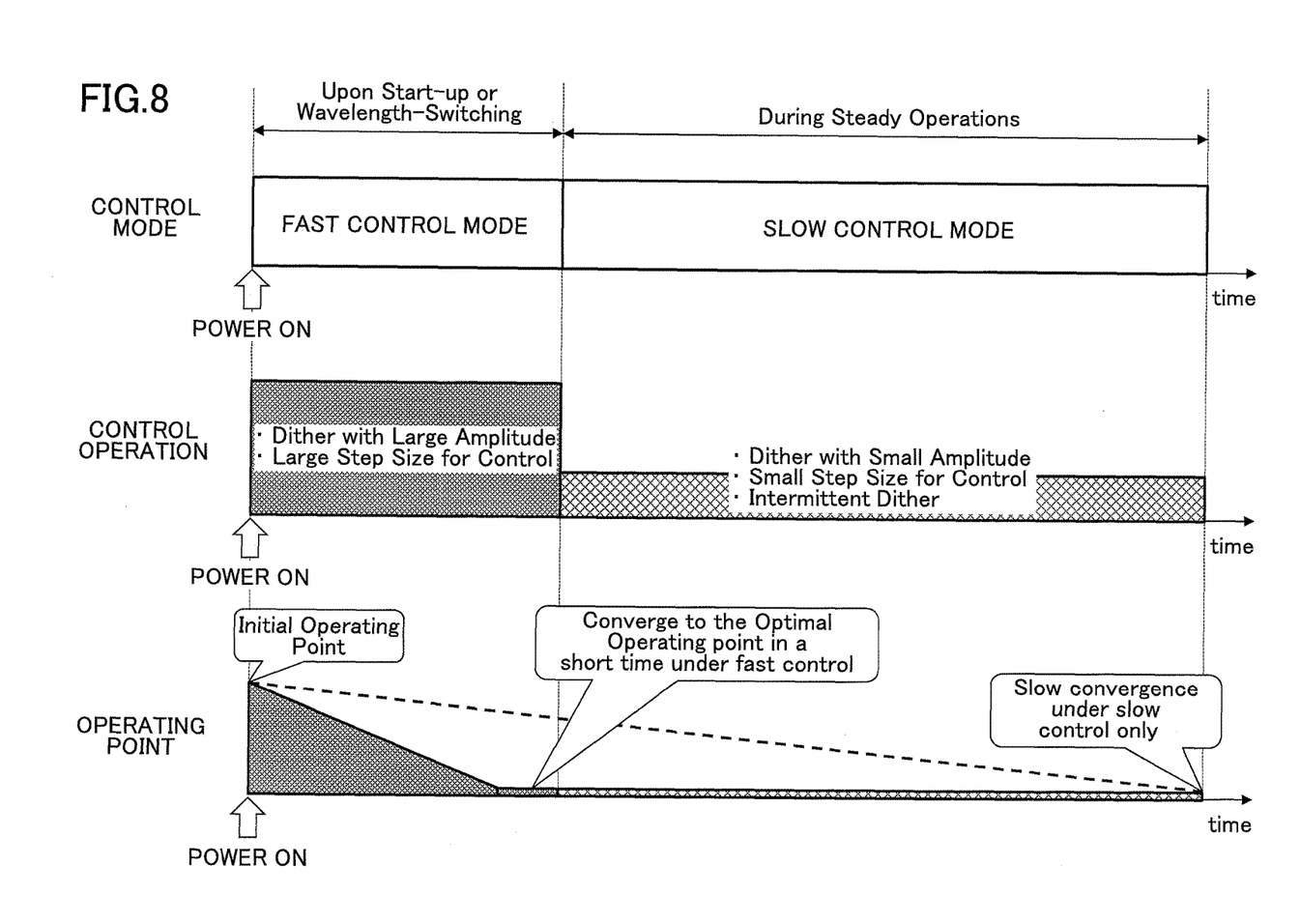
FIG. 8 illustrates a combination of the intermittent dither superimposition control and high-speed control performed when starting up or switching wavelength.

FIG. 8 is a diagram to explain intermittent dither superimposition of the embodiment combined with high-speed control performed when starting up an optical transmitter. By applying dither signals intermittently or discontinuously, bit error rate can be reduced. However, time taken for convergence to the optimal operating point may be increased. During steady operations, the priority is to reduce degradation of transmission characteristics rather than the control speed. The steady state means that the optical transmitter 10A or 10B is carrying out optical signal transmission in a stable manner. In the steady operations, control operation using a dither is performed so as to follow a phenomenon changing slowly such as temperature change or change over time. Meanwhile, when starting up or switching between wavelengths, it is desirable for the optical transmitter to quickly achieve convergence to the optimal operating point.

From this viewpoint, high-speed control is performed at start-up or wavelength switching for the sake of quick convergence to the optimal operating point, while during steady operations control for preventing the transmission characteristic from degrading is performed at an ordinary control speed under intermittent dither superimposition. As illustrated in the middle row of FIG. 8, the priority is given to the control speed in the high-speed control stage, while tolerating degradation of characteristics to some extent. For example, the amplitude of the dither signal is set greater than that for the steady operations in order to increase the control speed because little consideration is made to occurrence of bit error at start-up or wavelength switching. Thin-out (or intermittent superimposition) of dither signals may be withheld during the high-speed control, rather than dithering being performed continuously. It should be noted that "continuous dithering" encompasses continuous application of dither pulses at a constant frequency even if the dither is applied in the form of a pulse. When starting up the optical transmitter or switching the wavelength, the step size (or interval) of control may be broadened in order for prioritizing the convergence to the optimal operating point. For example, the substrate bias voltage may be controlled toward the target level in seconds. The step size and/or the target to be controlled may be changed at start-up or wavelength switching. For example, a control target to which a dither is superimposed may be switched from a substrate bias voltage to a drive signal for the optical modulator.

In contrast, in the steady state operations, the priority is to prevent the transmission quality such as bit error rate from degrading, rather than the control speed. In this regard, the amplitude of the dither signal and the control step size are reduced, and intermittent dither superimposition is applied.

With the above-stated control scheme, the operating point is converged from the initial point to the optimal point in a short time upon start-up of wavelength switching, as illustrated in the bottom row of FIG. 8. As indicated by the dashed line in FIG. 8, convergence to the optimal operating point may be delayed when the intermittent dither superimposition is performed at start-up or wavelength switching in a similar manner to the steady operations. Such delay in convergence can be avoided by changing the control mode or scheme between the start-up (or wavelength switching) and the steady operation, and the optimal control is performed in accordance to the situations.

Figure 9:
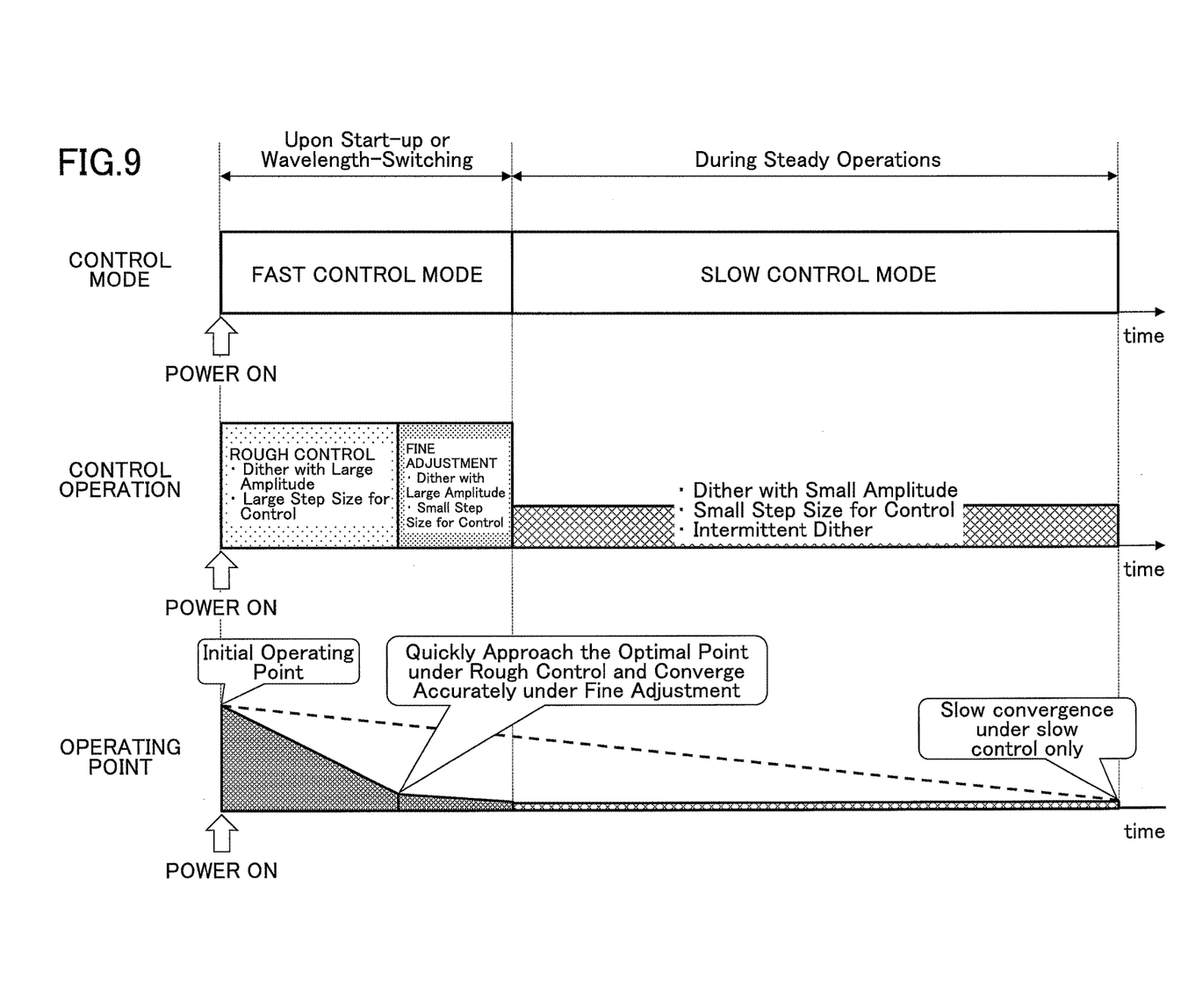
FIG. 9 illustrates an example of two-stage control performed when starting up or switching wavelength.

FIG. 9 illustrates another example of high-speed control performed upon the start up or wavelength switching. In FIG. 9, two-stage control with rough adjustment and fine adjustment is employed for the high-speed control in the start-up or the wavelength switching process. Under rough adjustment, the control step size is increased and a dither signal with an increased amplitude is used to achieve fast convergence to the optimal operating point. Under fine adjustment, the control step size is reduced while maintaining the amplitude of the dither signal to achieve accurate convergence to the optimal operating point. The two-stage control illustrated in FIG. 9 realizes faster and more accurate convergence to the optimal operating point.

<Optical Communication System>

Figure 10:
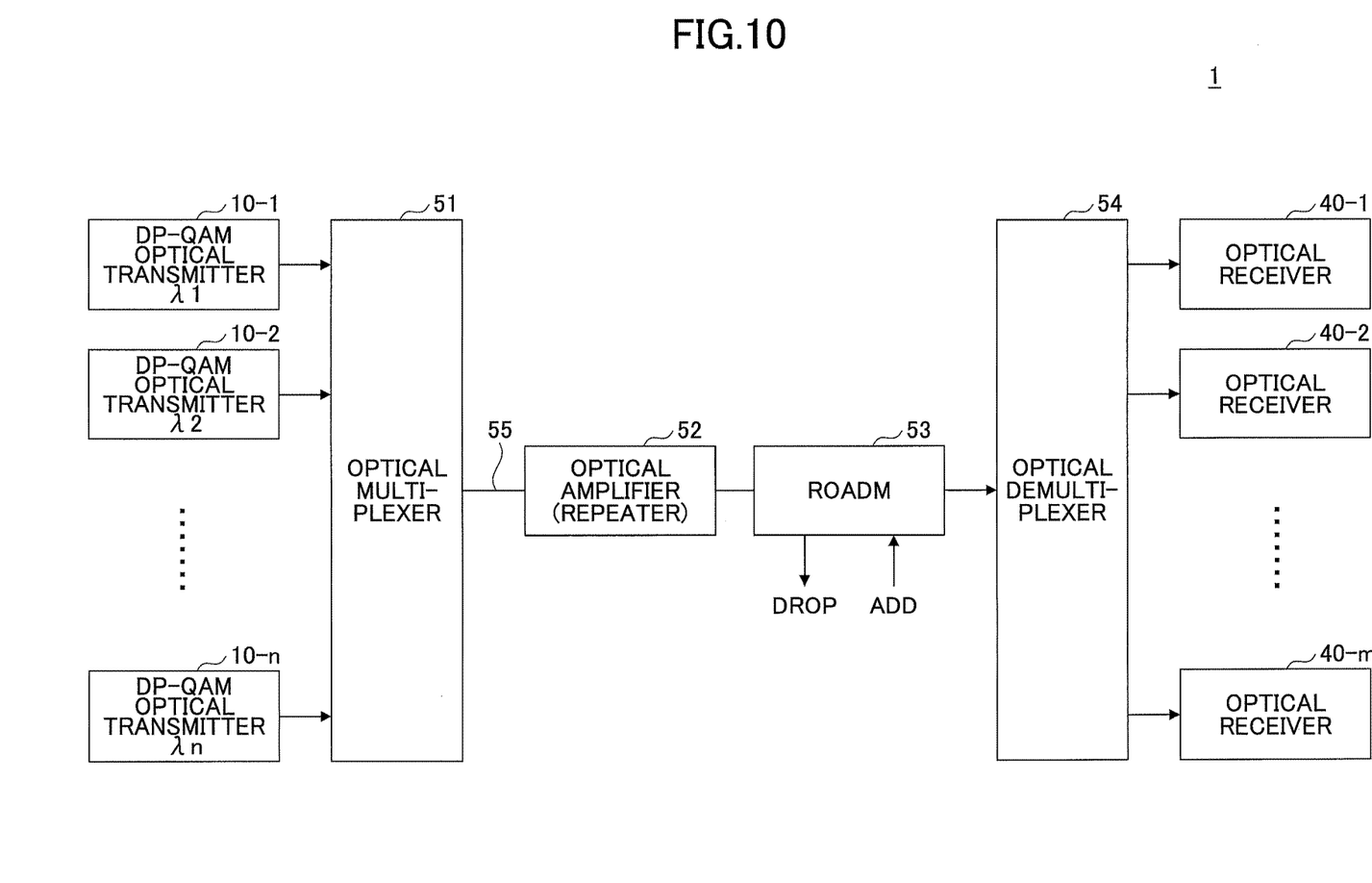
FIG. 10 illustrates an optical communication system using an optical transmitter according to an embodiment.

FIG. 10 is a schematic diagram of an optical communication system 1 using the optical transmitter 10 according to an embodiment. The optical communication system 1 includes optical transmitters 10-1 to 10-n, an optical multiplexer 51, an optical amplifier repeater 52, a reconfigurable optical add/drop multiplexer (ROADM) 53, an optical demultiplexer 54, and optical receivers 40-1 to 40-m.

Either the optical transmitter 10A of FIG. 3 or the optical transmitter 10B of FIG. 4 may be used as the optical transmitters 10-1 to 10-n. The optical transmitters 10-1 to 10-n output optically modulated signals at different wavelengths (λ1 to λn).

The optical multiplexer 51 multiplexes the optical-modulated signals of different wavelengths output from the optical transmitters 10-1 to 10-n by wavelength division multiplexing and outputs a multiplexed optical signal into an optical transmission path 55 such as a fiber optic cable.

The optical amplifier repeater 52 amplifies the multiplexed optical signal and compensates for transmission loss having been generated in the transmission path.

The ROADM 53 adds a light signal of a desired wavelength to and drops a light signal of a selected wavelength from the transmitted multiplexed optical signal. The ROADM 53 may take out two or more light signals of different wavelengths from the WDM signal relayed from the optical amplifier repeater 52 and output the WDM signals to the optical demultiplexer 54.

The optical demultiplexer 54 demultiplexes the WDM signal output from the ROADM 53 into optically modulated signals of the respective wavelengths and distributes the demultiplexed optical signals to the optical receivers 40-1 to 40-m. The optical receivers 40-1 to 40-m receive optically modulated signals of the associated wavelengths from the optical demultiplexer 54 and carry out signal reception and processing such as polarization separation and QAM demodulation. At least a part of the optical receivers 40-1 to 40-m may transmit an optical signal to a large-scale optical router (or switch) for routing optical signals to designated directions.

When the optical receivers 40-1 to 40-m are digital coherent optical receivers, they have wavelength or channel selection ability. In this case, the optical communication system 1 may be configured without using an optical demultiplexer 54.

The optical communication system 1 can be built up to be a large capacity optical network because of transmission and reception of wavelength-multiplexed optical signals in addition to polarization duplexing and QAM modulation at each of the optical transmitters 10-1 to 10-n.

By performing intermittent dither superimposition control at the optical transmitters 10-1 to 10-n according to the embodiment, degradation of the transmission quality can be reduced even though multi-level QAM modulation is performed in a large-capacity optical transmission/reception network system.

Although FIG. 3, FIG. 4 and FIG. 10 depict structural examples and functions on the transmitter side, the invention is applicable to an optical transceiver furnished with the optical transmitter 10 and the optical receiver 40 in a single unit or module because in general optical communications are performed bi-directionally including signal transmission and reception. The control architectures of FIG. 3 and FIG. 4 may be employed all together, or the control functions of FIG. 3 and FIG. 4 may be executed by a single processor using information in a memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. An optical transmitter that transmits an optical signal: comprising:
   a dither superimposing circuit configured to generate a dither signal, the dither signal being used to control an operation of the optical transmitter to output the optical signal;
   a control circuit configured to control intermittent superimposition of the dither signal onto a target to be controlled; and an optical modulator configured to modulate a light beam emitted from a light source with an electrical data signal, wherein the optical modulator has a first Mach-Zehnder modulator and a second Mach-Zehnder modulator, and wherein the control circuit is configured to apply the intermittent superimposition of the dither signal to a first control operation for controlling an optical phase of the light beam travelling through the first Mach-Zehnder modulator, a second control operation for controlling an optical phase of the light beam travelling through the second Mach-Zehnder modulator, and a third control operation for controlling a phase difference between the light beams travelling through the first Mach-Zehnder modulator and the second Mach-Zehnder modulator.

2. The optical transmitter as claimed in claim 1, wherein the control circuit is configured to control in an adaptive manner at least one of a timing of performing the intermittent superimposition of the dither signal, a dither signal thin-out rate, a time width of applying the dither signal, a period of the intermittent superimposition of the dither signal, a duty ratio of the intermittent superimposition, and an amplitude of the dither signal.

3. The optical transmitter as claimed in claim 1, wherein when two or more targets are to be controlled using the dither signal, the control circuit selectively changes a control mode of the intermittent superimposition of the dither signal depending on the targets to be controlled.

4. The optical transmitter as claimed in claim 1, wherein the control circuit is configured to change a control mode of the intermittent superimposition of the dither signal between a steady state operation and a start-up or wavelength switching operation of the optical transmitter.

5. The optical transmitter as claimed in claim 4, wherein the control circuit is configured to change a control step size of the intermittent superimposition of the dither signal for the start-up or the wavelength switching operation.

6. The optical transmitter as claimed in claim 4, wherein the control circuit is configured to perform first control for convergence to an optimal operating point with a first control step size and second control for the convergence to the optimal operating point with a second control step size.

7. The optical transmitter as claimed in claim 1, wherein the control circuit is configured to apply the intermittent superimposition of the dither signal when controlling an operating point of the optical modulator.

8. The optical transmitter as claimed in claim 1, wherein the control circuit is configured to change a control mode of the intermittent superimposition of the dither signal among the first control operation, the second control operation and the third control operation.

9. The optical transmitter as claimed in claim 8, wherein the control circuit is configured to perform the first control operation, the second control operation, and the third control operation in a time sharing manner, and change a dither signal thin-out ratio between the third control operation and the first and second control operations.

10. The optical transmitter as claimed in claim 8, wherein the control circuit is configured to set an amplitude of the dither signal applied to the first control operation and the second control operation smaller than that of the dither signal applied to the third control operation.

11. An optical communication system comprising:

an optical transmitter that transmits an optical signal, the optical transmitter having a dither superimposing circuit configured to generate a dither signal, the dither signal being used to control an operation of the optical transmitter to output the optical signal, a control circuit configured to control intermittent superimposition of the dither signal onto a target to be controlled, and an optical modulator configured to modulate a light beam emitted from a light source with an electrical data signal; and an optical receiver connected to the optical transmitter by an optical transmission path, wherein the optical modulator has a first Mach-Zehnder modulator and a second Mach-Zehnder modulator, and wherein the control circuit is configured to apply the intermittent superimposition of the dither signal to a first control operation for controlling an optical phase of the light beam travelling through the first Mach-Zehnder modulator, a second control operation for controlling an optical phase of the light beam travelling through the second Mach-Zehnder modulator, and a third control operation for controlling a phase difference between the light beams travelling through the first Mach-Zehnder modulator and the second Mach-Zehnder modulator.

12. A control method for an optical transmitter that transmits an optical signal, comprising:

generating a dither signal, the dither signal being used to control an operation of the optical transmitter to output the optical signal, and controlling intermittent superimposition of the dither signal onto a target to be controlled, wherein the target to be controlled is an optical modulator having a first Mach-Zehnder modulator and a second Mach-Zehnder modulator, and wherein the controlling includes applying the intermittent superimposition of the dither signal to a first control operation for controlling an optical phase of a light beam travelling through the first Mach-Zehnder modulator, a second control operation for controlling an optical phase of the light beam travelling through the second Mach-Zehnder modulator, and a third control operation for controlling a phase difference between the light beams travelling through the first Mach-Zehnder modulator and the second Mach-Zehnder modulator.

13. The control method as claimed in claim 12, wherein at least one of a timing of performing the intermittent superimposition of the dither signal, a dither signal thin-out rate, a time width of applying the dither signal, a period of the intermittent superimposition of the dither signal, a duty ratio of the intermittent superimposition, and an amplitude of the dither signal is controlled in an adaptive manner.

\* \* \* \* \*